United States Patent
Yoshimura (10) Patent No.: US 10,360,707 B2
(45) Date of Patent: Jul. 23, 2019

(54) INFORMATION PROCESSING APPARATUS, INFORMATION PROCESSING METHOD, AND STORAGE MEDIUM FOR TRANSFORMING PATH

(71) Applicant: CANON KABUSHIKI KAISHA, Tokyo (JP)

(72) Inventor: Yasuhiro Yoshimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 14/986,493

(22) Filed: Dec. 31, 2015

(65) Prior Publication Data
US 2016/0196678 A1 Jul. 7, 2016

(30) Foreign Application Priority Data
Jan. 5, 2015 (JP) .................................. 2015-000436

(51) Int. Cl.
*G06T 11/60* (2006.01)

(52) U.S. Cl.
CPC .................................. *G06T 11/60* (2013.01)

(58) Field of Classification Search
CPC ........................................................ G06T 11/60
See application file for complete search history.

(56) References Cited

U.S. PATENT DOCUMENTS

| | | | | |
|---|---|---|---|---|
| 5,715,473 A | * | 2/1998 | Reed | G06F 17/214 715/210 |
| 5,959,634 A | * | 9/1999 | Yoshida | G06K 15/02 345/467 |
| 2007/0188497 A1 | * | 8/2007 | Dowling | G06T 11/203 345/469 |
| 2009/0091574 A1 | * | 4/2009 | Sawazaki | G06T 11/203 345/469 |

FOREIGN PATENT DOCUMENTS

| | | |
|---|---|---|
| JP | H02-297681 A | 12/1990 |
| JP | H08101675 A | 4/1996 |

OTHER PUBLICATIONS

Shardt O, Bowman JC (2012) Surface parameterization of nonsimply connected planar bzier regions. Computer-Aided Design 44: 484. e1-484.e10.*

* cited by examiner

*Primary Examiner* — Kee M Tung
*Assistant Examiner* — Grace Q Li
(74) *Attorney, Agent, or Firm* — Canon U.S.A., Inc. IP Division (57) ABSTRACT

An information processing apparatus including an acquisition unit configured to acquire a plurality of vertices forming a one path included in a glyph path, a calculation unit configured to calculate a winding value relating to the one path, a determination unit configured to determine a shift direction of the one path based on the calculated winding value, and a movement unit configured to move positions of the plurality of vertices based on the determined shift direction.

8 Claims, 10 Drawing Sheets

```
<Paths Id="1" PathNum="2">          — 401
    <Path Id="1" PointNum="4">      — 410
        <Point Id="1" X="40" Y="30" />   — 411
        <Point Id="2" X="40" Y="20" />   — 412
        <Point Id="3" X="80" Y="20" />   — 413
        <Point Id="4" X="80" Y="30" />   — 414
    </Path>                         — 415
    <Path Id="2" PointNum="4">      — 420
        <Point Id="1" X="20" Y="60" />   — 421
        <Point Id="2" X="100" Y="60" />  — 422
        <Point Id="3" X="100" Y="50" />  — 423
        <Point Id="4" X="20" Y="50" />   — 424
    </Path>                         — 425
</Paths>                            — 402
```
400

```
1600 — <Paths Id="1" PathNum="2">          — 1601
          <Path Id="1" PointNum="4">        — 1610
            <Point Id="1" X="10" Y="60" />  — 1611
            <Point Id="2" X="10" Y="10" />  — 1612
            <Point Id="3" X="60" Y="10" />  — 1613
            <Point Id="4" X="60" Y="60" />  — 1614
          </Path>                           — 1615
          <Path Id="2" PointNum="4">        — 1620
            <Point Id="1" X="20" Y="50" />  — 1621
            <Point Id="2" X="50" Y="50" />  — 1622
            <Point Id="3" X="50" Y="20" />  — 1623
            <Point Id="4" X="20" Y="20" />  — 1624
          </Path>                           — 1625
        </Paths>                            — 1602
```

ND STORAGE MEDIUM FOR
INFORMATION PROCESSING APPARATUS, INFORMATION PROCESSING METHOD, AND STORAGE MEDIUM FOR TRANSFORMING PATH

BACKGROUND OF THE INVENTION

Field of the Invention

Aspects of the present invention generally relate to processing for transforming a path.

Description of the Related Art

Some glyph paths are used to form a font by filling a closed region that is defined by a path connecting a plurality of vertices (control points) in sequence. Bold processing for thickening the glyph path is discussed in Japanese Patent Application Laid-Open No. 8-101675. The bold processing for a glyph path discussed in Japanese Patent Application Laid-Open No. 8-101675 includes making the shape of a path one size larger by moving each control point in the direction normal to the advancing direction of the path, and filling a closed region that is defined by the path.

However, the bold processing discussed in Japanese Patent Application Laid-Open No. 8-101675 assumes that, in a case where there is a plurality of closed regions that constitutes a font, the advancing directions of the paths defining the respective closed regions are the same. Therefore, in a case where the advancing direction of the path is different with each closed region, the normal direction to move a control point may differ with each closed region, so that the area of a certain closed region may become small. In other words, a part of the glyph path may become thin.

Figure 8A:
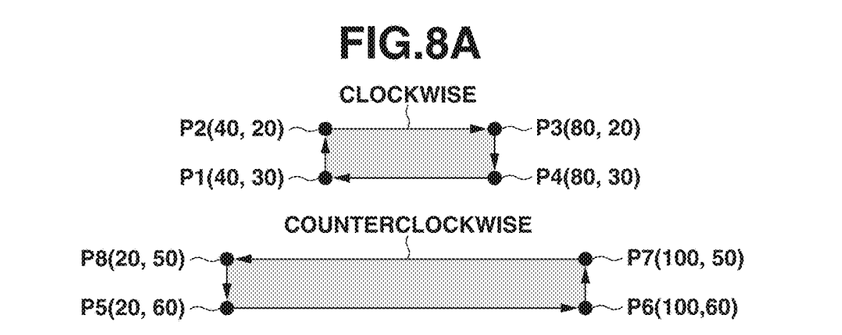
FIGS. 8A, 8B, and 8C illustrate an example of a glyph path in which the advancing direction of a path differs with each closed region.

For example, as illustrated in FIG. 8A, the advancing direction of a path defining an upper closed region of a glyph path for the katakana letter ni is clockwise (right-hand turning) and the advancing direction of a path defining a lower closed region of the glyph path is counterclockwise (left-hand turning). In this case, if the normal direction is set to the left-hand side relative to the advancing direction of a path, the upper closed region is transformed in such a way that the area thereof becomes large, but the lower closed region is transformed in such a way that the area thereof becomes small.

SUMMARY OF THE INVENTION

According to an aspect of the present invention, an information processing apparatus includes an acquisition unit configured to acquire a plurality of vertices forming a one path included in a glyph path, a calculation unit configured to calculate a winding value relating to the one path, a determination unit configured to determine a shift direction of the one path based on the calculated winding value, and a movement unit configured to move positions of the plurality of vertices based on the determined shift direction.

Further features of the present invention will become apparent from the following description of exemplary embodiments with reference to the attached drawings.

DESCRIPTION OF THE EMBODIMENTS

Figure 1:
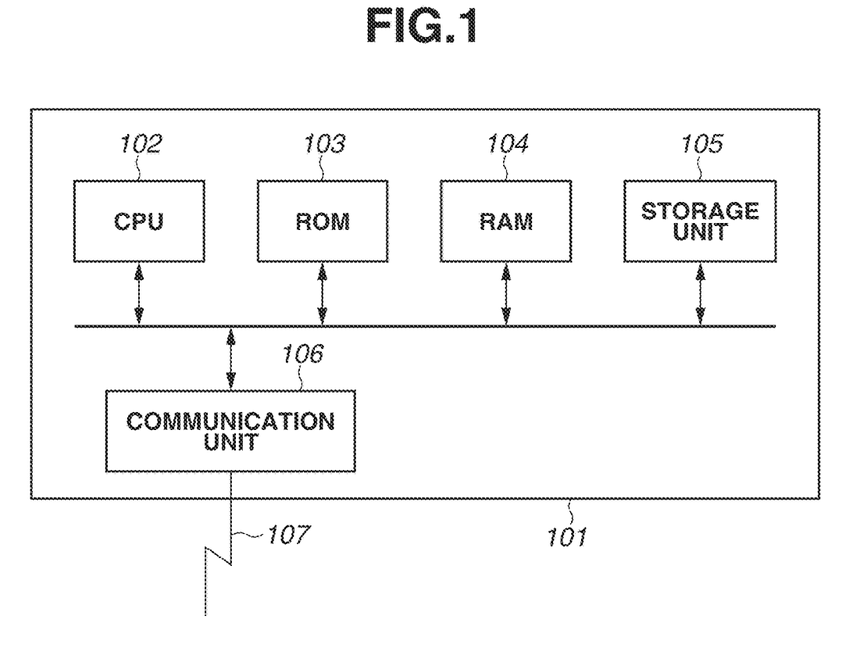
FIG. 1 is a block diagram illustrating a hardware configuration of an information processing apparatus according to an exemplary embodiment of the present invention.

FIG. 1 is a block diagram illustrating a hardware configuration of an information processing apparatus 101 according to an exemplary embodiment of the present invention. The information processing apparatus 101 includes a central processing unit (CPU) 102, a read-only memory (ROM) 103, a random access memory (RAM) 104, a storage unit 105, which is a hard disk drive (HDD), and a communication unit 106, which is an interface used to connect the information processing apparatus 101 with a local area network (LAN) 107.

The storage unit 105 stores programs for controlling the information processing apparatus 101. For example, the storage unit 105 stores a program for performing a processing flow illustrated in FIG. 3, which is described below.

The communication unit 106 receives, from an external apparatus other than the information processing apparatus 101, page-description language (PDL) data, such as Portable Document Format (PDF) data or XML Paper Specification (XPS®) data.

The CPU 102 comprehensively controls the ROM 103, the RAM 104, the storage unit 105, and the communication unit 106. For example, the CPU 102 executes a program stored in the storage unit 105 using the RAM 104 or the ROM 103 to perform a processing flow illustrated in FIG. 3, which is described below, on PDL data 201 (FIG. 3) received by the communication unit 106.

Figure 2:
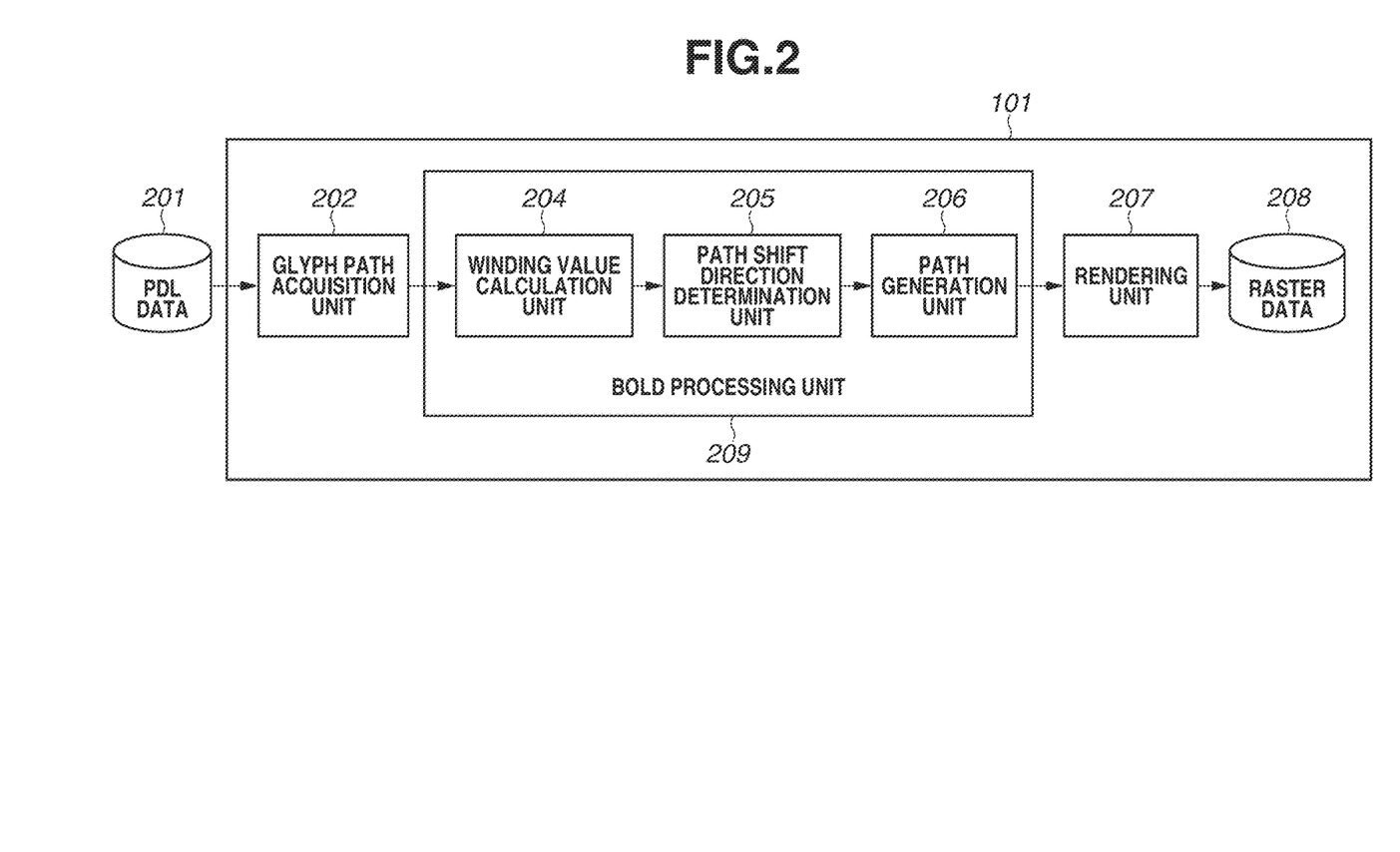
FIG. 2 is a block diagram illustrating a configuration of software modules of the information processing apparatus according to the exemplary embodiment.

FIG. 2 is a block diagram illustrating a configuration of software modules implemented by the CPU 102 executing the program for performing the processing flow illustrated in FIG. 3, which is described below. The CPU 102 of the information processing apparatus 101 functions as a glyph path acquisition unit 202, a bold processing unit 209, and a rendering unit 207. The glyph path acquisition unit 202 acquires a glyph path included in the PDL data 201 received by the communication unit 106. The bold processing unit 209 performs bold processing on the acquired glyph path. The rendering unit 207 performs rendering (rasterizing) of the glyph path subjected to the bold processing, thus generating raster data 208. The bold processing unit 209 includes a winding value (winding number) calculation unit 204, a path shift direction determination unit 205, and a path generation unit 206, the details of each of which are described below.

Figure 3:
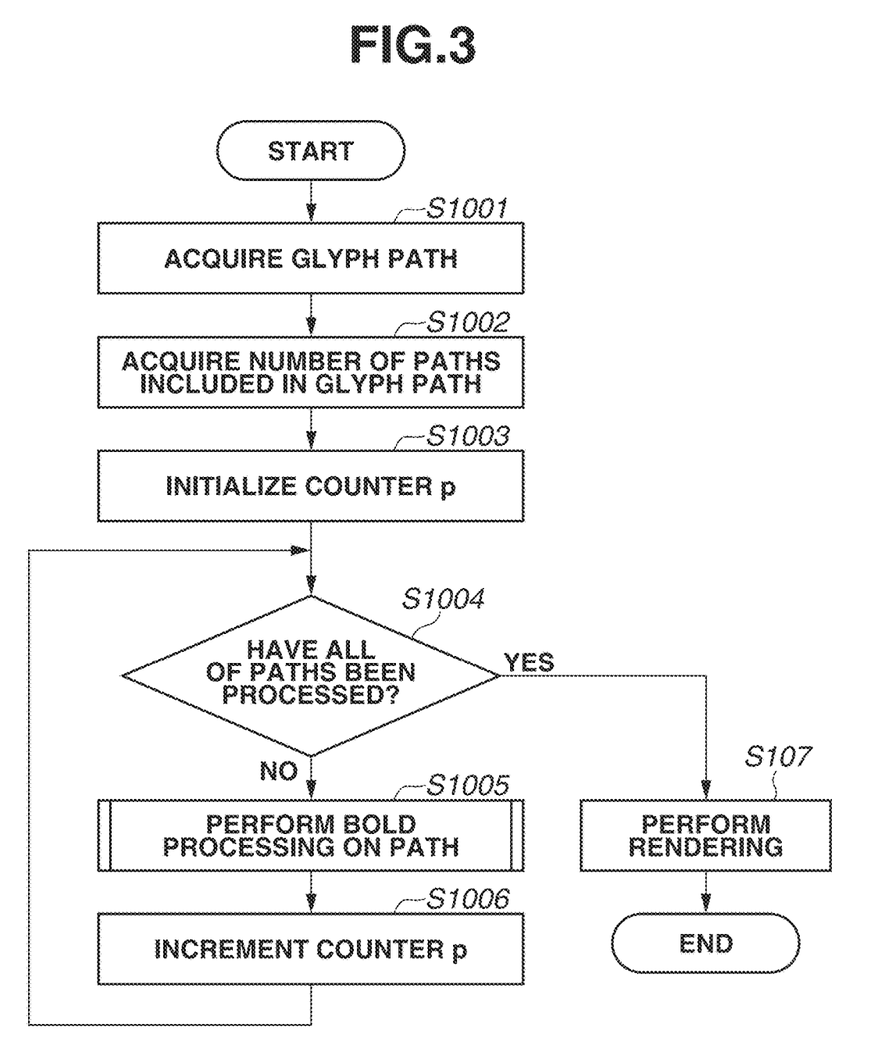
FIG. 3 is a flowchart illustrating processing performed on a glyph path.

FIG. 3 illustrates a processing flow performed by the CPU 102 executing a program stored in the storage unit 105 using the ROM 103 or the RAM 104. The processing flow illustrated in FIG. 3 is a processing flow for performing bold processing and rendering on a glyph path included in the PDL data 201 received by the communication unit 106. While the following description is directed to one glyph path included in the PDL data 201, in a case where a plurality of glyph paths is included in the PDL data 201, each processing is repeated a number of times corresponding to the number of glyph paths. Incidentally, the processing flow illustrated in FIG. 3 is not performed with respect to any graphical object other than glyph paths.

In step S1001, the glyph path acquisition unit 202 analyzes the PDL data 201, which has been received by the communication unit 16 from an external apparatus via the LAN 107, to acquire a glyph path included in the PDL data 201. This acquisition is described now. The PDL data 201 contains a plurality of drawing commands for graphical objects. The glyph path acquisition unit 202 determines a drawing command distinguished by an identifier indicating a glyph path (a glyph path drawing command) from among the plurality of drawing commands. Then, the glyph path acquisition unit 202 stores information about the glyph path drawing command into the RAM 104.

FIGS. 8A, 8B, and 8C and FIGS. 9A, 9B, and 9C illustrate examples of glyph paths and glyph path drawing commands. Each glyph path includes a plurality of vertices.

FIG. 8A illustrates an example of a glyph path represented by two paths, each of which is constituted by four vertices. Vertices P1, P2, P3, and P4 are connected in the order of the vertices P1, P2, P3, and P4, and constitute a first path, which advances clockwise and defines a first closed region. Vertices P5, P6, P7, and P8 are connected in the order of the vertices P5, P6, P7, and P8, and constitute a second path, which advances counterclockwise and defines a second closed region. Thus, in the glyph path illustrated in FIG. 8A, the advancing direction of a path differs with each closed region. Two closed regions defined by the respective paths are filled with a designated color to form the katakana letter ni. The two paths and two closed regions in the glyph path representing the katakana letter ni have no overlap. Furthermore, although not illustrated, in a case where two paths have an overlap (for example, in a case where a path connecting vertices and control points in sequence representing a Bezier curve has an overlap with another path), as long as the advancing directions of the two paths are the same, appropriate bold processing can be performed in the following processing flow according to the present exemplary embodiment.

Figure 9A:
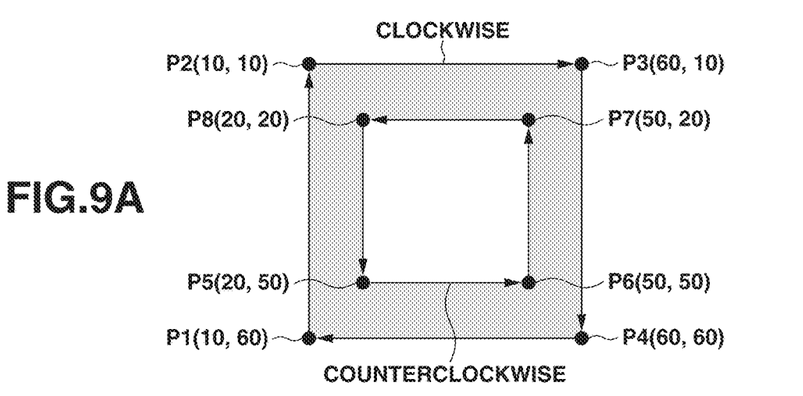
FIGS. 9A, 9B, and 9C illustrate an example of a glyph path in which one closed region is defined by two paths.

FIG. 9A illustrates an example of a glyph path represented by two paths, each of which is constituted by four vertices. Vertices P1, P2, P3, and P4 are connected in the order of the vertices P1, P2, P3, and P4, and constitute a first path, which advances clockwise. Vertices P5, P6, P7, and P8 are connected in the order of the vertices P5, P6, P7, and P8, and constitute a second path, which advances counterclockwise. The first path and the second path respectively correspond to the outer edge and inner edge of one closed region. One closed region defined by the two paths are filled with a designated color to form the katakana letter ro. The two paths in the glyph path representing the katakana letter ro have no overlap.

Figure 8B:
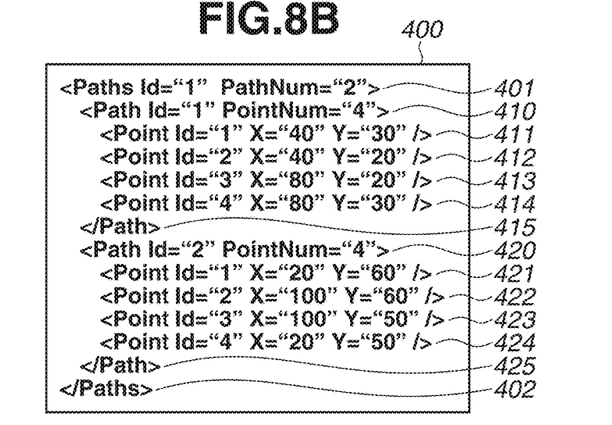

FIG. 8B illustrates an example of a glyph path drawing command 400 representing the glyph path illustrated in FIG. 8A. The glyph path drawing command 400 is expressed by one or more paths included between a start tag 401 (<Paths>) and an end tag 402 (</Paths>) of an identifier indicating a glyph path, i.e., an element name "Paths".

The start tag 401 contains a plurality of attributes, i.e., an Id attribute and a PathNum attribute. The Id attribute indicates an identification number for uniquely identifying a glyph path, and the PathNum attribute indicates the number of paths included in the glyph path. The attribute value of the Id attribute contained in the start tag 401 is "1", and the attribute value of the PathNum attribute is "2". Therefore, the identification number of the glyph path is "1", and the number of paths included in the glyph path is "2". The contents of the Paths element included between the start tag 401 and the end tag 402 include a start tag 410 of a first Path element, the contents of the first Path element (empty-element tags 411 to 414 of four Point elements), an end tag 415 of the first Path element, a start tag 420 of a second Path element, the contents of the second Path element (empty-element tags 421 to 424 of four Point elements), and an end tag 425 of the second Path element. Thus, the contents of the Paths element express paths the number of which corresponds to the number of paths included in a glyph path.

The start tag 410 of the first Path element contains an Id attribute and a PointNum attribute. The Id attribute indicates an identification number for uniquely identifying a path included in the glyph path, and the PointNum attribute indicates the number of vertices (or control points) of a path identified by the identification number of the Id attribute. In the following description, a control point is also referred to as a vertex. The contents of the Path element include information indicating the coordinates of each vertex of the path, i.e., empty-element tags 411 to 414 of the Point element.

Each of the empty-element tags 411 to 414 of the four Point elements contains an Id attribute, an X attribute, and a Y attribute. The Id attribute indicates an identification number for uniquely identifying a vertex of the path. The X attribute and the Y attribute respectively indicate the X coordinate and the Y coordinate of the vertex. For example, the empty-element tag 411 of the Point element indicates that the coordinates of the vertex with the identification number "1" are (X, Y)=(40, 30). The empty-element tags 412 to 414 of the other Point elements also indicate similar contents.

Furthermore, the start tag 420 and the contents (the empty-element tags 421 to 424) of the second Path element are also similar to those of the first Path element.

The empty-element tags of a Point element included in the glyph path drawing command 400 illustrated in FIG. 8B correspond to the vertices of the glyph path illustrated in FIG. 8A. In other words, the vertices indicated by the empty-element tags 411 to 414 of the Point element respectively correspond to the vertices P1 to P4, and the vertices indicated by the empty-element tags 421 to 424 of the Point element respectively correspond to the vertices P5 to P8.

Figure 9B:
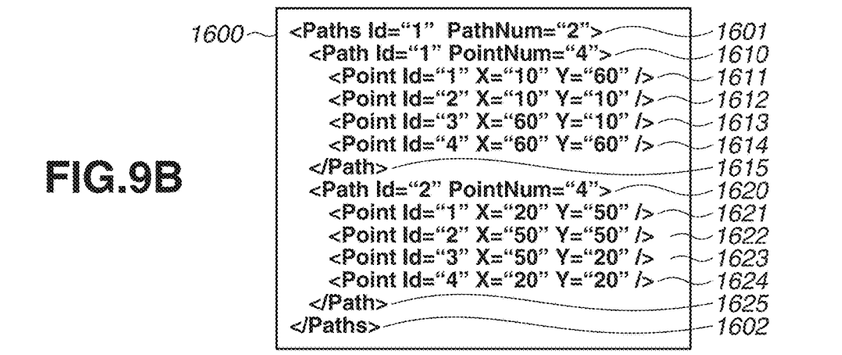

FIG. 9B illustrates an example of a glyph path drawing command 1600 representing the glyph path illustrated in FIG. 9A, as FIG. 8B does.

The glyph path acquisition unit 202 identifies a glyph path drawing command by identifying the Paths element based on the PDL data 201, and stores, into the RAM 104, information about the glyph path drawing command in link form.

Figure 8C:
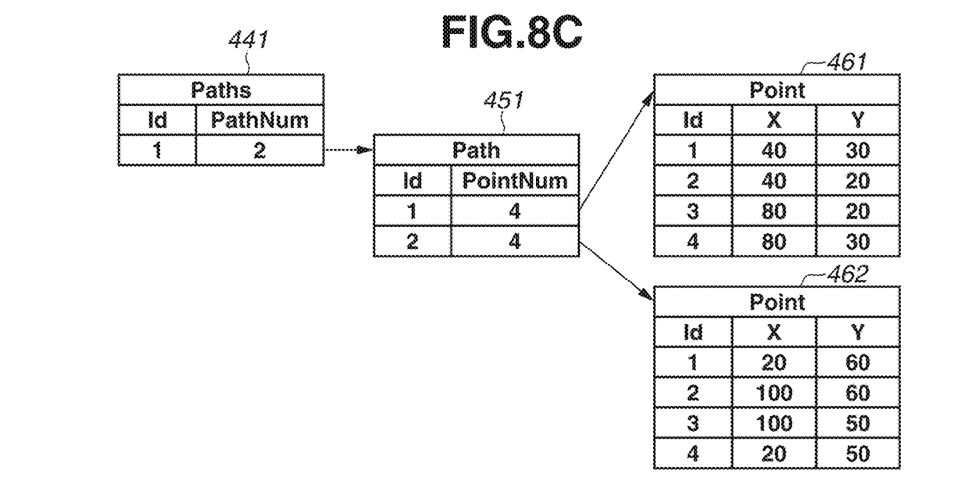

For example, the glyph path acquisition unit 202 stores, into the RAM 104, information about the glyph path drawing command 400 in the link form illustrated in FIG. 8C. First, the glyph path acquisition unit 202 generates a Paths structure 441. The Paths structure 441 contains Id and PathNum. Id and PathNum are respectively equal to the Id attribute value and the PathNum attribute value of the start tag 401 of the Paths element. Then, the glyph path acquisition unit 202 generates a Path structure 451. The Path structure 451 contains one or more sets of Id and PointNum.

Id and PointNum in one set are respectively equal to the Id attribute value and the PointNum attribute value of one Path element start tag (410 or 420). The glyph path acquisition unit 202 interconnects the Paths structure 441 and the Path structure 451 with a link.

Then, the glyph path acquisition unit 202 generates a Point structure corresponding to each path included in the glyph path. For example, the glyph path acquisition unit 202 generates a Point structure 461 corresponding to a record with the Id "1" of the Path structure 451, and generates a Point structure 462 corresponding to a record with the Id "2" of the Path structure 451. The Point structure 461 or 462 contains Id, X, and Y. Id, X, and Y are respectively equal to the Id attribute value, the X attribute value, and the Y attribute value of the empty-element tag of each Point element, which is the content of the start tag 410 or 420. One Point structure corresponds to one path, and information about the vertices of the path (Id, X coordinate, and Y coordinate) is stored in the Point structure. For example, a plurality of records with the respective Ids "1" to "4" is stored in the Point structure 461, and the records correspond to the respective vertices P1 to P4 of the glyph path illustrated in FIG. 8A. Furthermore, for example, a plurality of records with the respective Ids "1" to "4" is stored in the Point structure 462, and the records correspond to the respective vertices P5 to P8 of the glyph path illustrated in FIG. 8A. The glyph path acquisition unit 202 interconnects each of the Point structures 461 and 462 and the corresponding record of the Path structure 451 with a link.

Figure 9C:
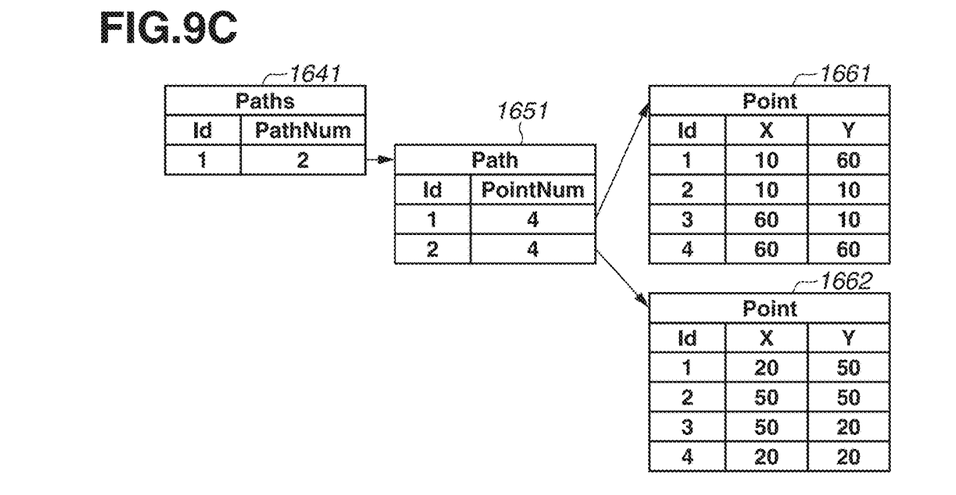

Thus, the above-described information in link form such as that illustrated in FIG. 8C is stored into the RAM 104. Furthermore, in a case where the glyph path drawing command 1600 is contained in the PDL data 201, information in link form such as that illustrated in FIG. 9C is stored into the RAM 104.

Referring back to the description of the processing flow illustrated in FIG. 3, in step S1002, the bold processing unit 209 acquires the number of paths included in the glyph path acquired in step S1001. More specifically, the bold processing unit 209 acquires the attribute value L of the PathNum attribute of the Paths element from information stored in the RAM 104. In the example illustrated in FIGS. 8A, 8B, and 8C, "2" is acquired, and, in the example illustrated in FIGS. 9A, 9B, and 9C, "2" is acquired.

In step S1003, the bold processing unit 209 initializes a counter p, which is used to count the number of processed paths, to "0".

In step S1004, the bold processing unit 209 determines whether the bold processing has been performed on all of the paths included in the glyph path. If the bold processing unit 209 determines that the bold processing has been performed on all of the paths (YES in step S1004), the processing proceeds to step S1007. Otherwise (NO in step S1004), the processing proceeds to step S1005. More specifically, the bold processing unit 209 determines whether the counter p is smaller than the attribute value L acquired in step S1002. If the bold processing unit 209 determines that the counter p is smaller than the attribute value L (NO in step S1004), the processing proceeds to step S1005. Otherwise (YES in step S1004), the processing proceeds to step S1007.

In step S1005, the bold processing unit 209 performs bold processing on a path corresponding to the counter p (i.e., the current target path). The details of the bold processing are described below with reference to FIGS. 4 to 7.

In step S1006, the bold processing unit 209 increments the counter p by one. Then, the processing returns to step S1004.

In step S1007, the rendering unit 207 performs rendering of the glyph path, which has been subjected to the bold processing, to generate font raster data 208. The rendering is performed according to a known method, such as painter's algorithm.

Then, the processing flow illustrated in FIG. 3 ends with respect to one glyph path.

Next, the bold processing performed on the current target path in step S1005 is described. The bold processing according to the present exemplary embodiment is broadly divided into four steps S1101 to S1104 illustrated in FIG. 4.

Figure 4:
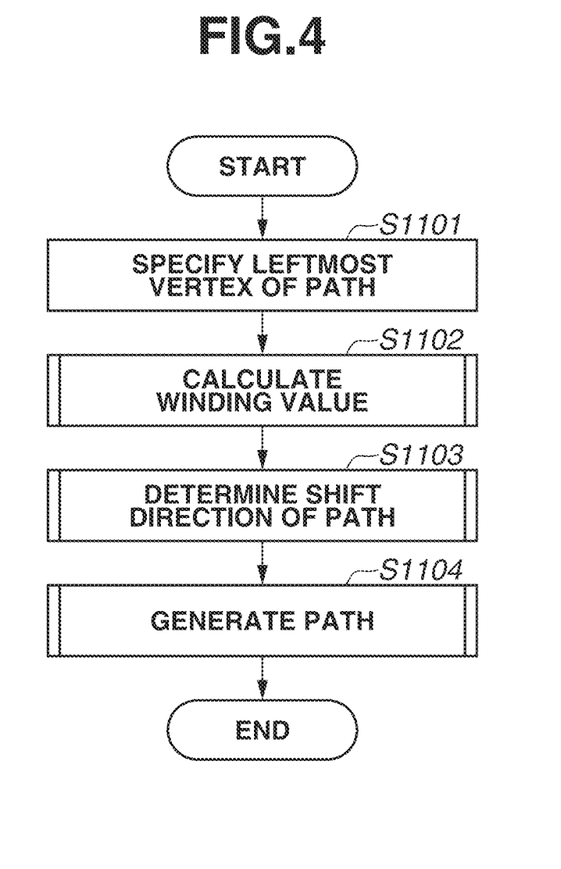
FIG. 4 is a flowchart illustrating bold processing performed on a path.

In step S1101, the winding value calculation unit 204 specifies a vertex having the smallest X coordinate (a leftmost point) from among the vertices constituting the current target path. More specifically, the winding value calculation unit 204 specifies a Point element having the smallest attribute value of the X attribute from among the Point elements stored in the RAM 104 with respect to the current target path. In this instance, if there is a plurality of Point elements equal in attribute value of the X attribute, the winding value calculation unit 204 selects any one of the plurality of Point elements. For example, the winding value calculation unit 204 selects a Point element having the smallest attribute value of the Y attribute.

With regard to a path identified by the Id attribute value "1" of the glyph path illustrated in FIGS. 8A, 8B, and 8C, a point P2 identified by the Id attribute value "2" of the Point element is specified. With regard to a path identified by the Id attribute value "2" of the glyph path illustrated in FIGS. 8A, 8B, and 8C, a point P8 identified by the Id attribute value "4" of the Point element is specified. With regard to a path identified by the Id attribute value "1" of the glyph path illustrated in FIGS. 9A, 9B, and 9C, a point P2 identified by the Id attribute value "2" of the Point element is specified. With regard to a path identified by the Id attribute value "2" of the glyph path illustrated in FIGS. 9A, 9B, and 9C, a point P8 identified by the Id attribute value "4" of the Point element is specified.

Figure 5:
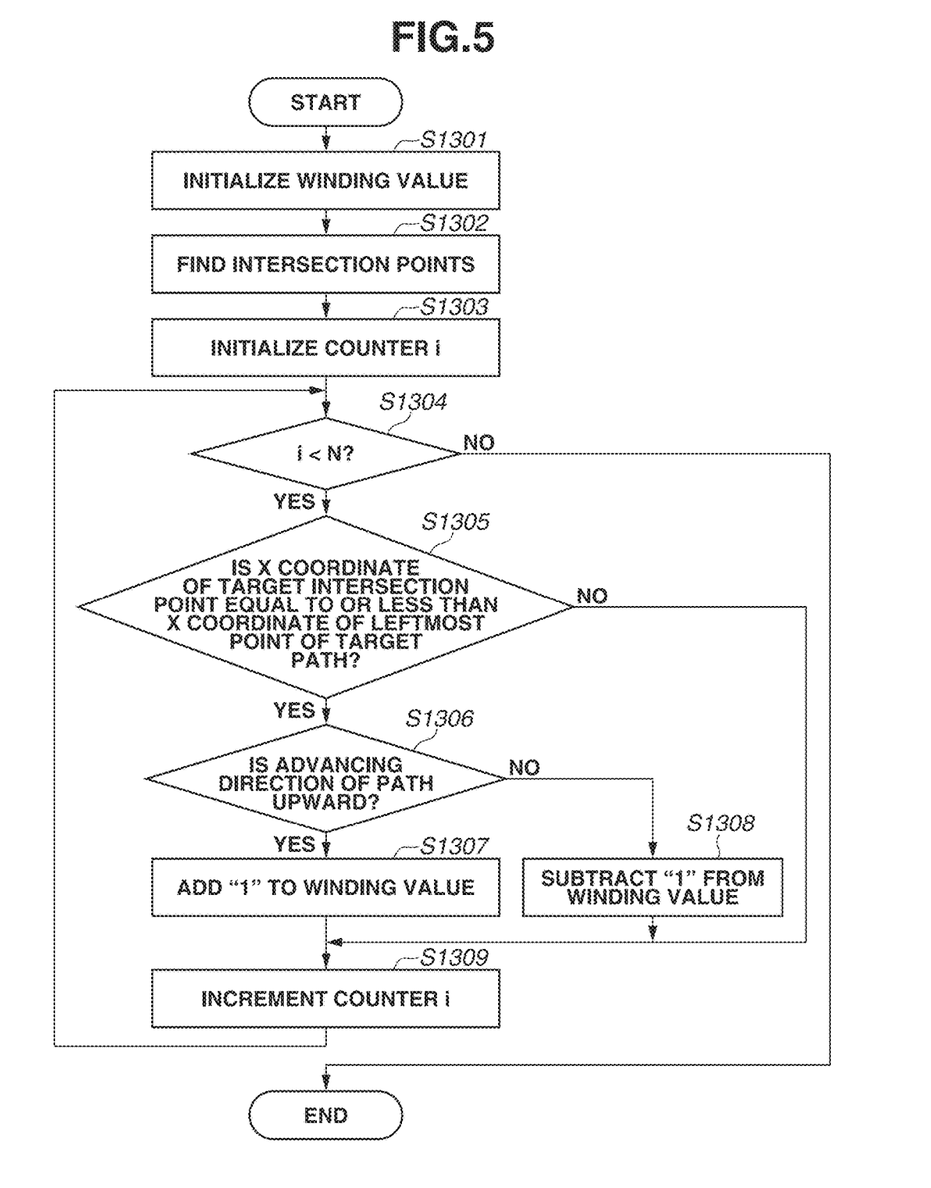
FIG. 5 is a flowchart illustrating processing for calculating a winding value.

In step S1102, the winding value calculation unit 204 performs a processing flow illustrated in FIG. 5.

Figure 6:
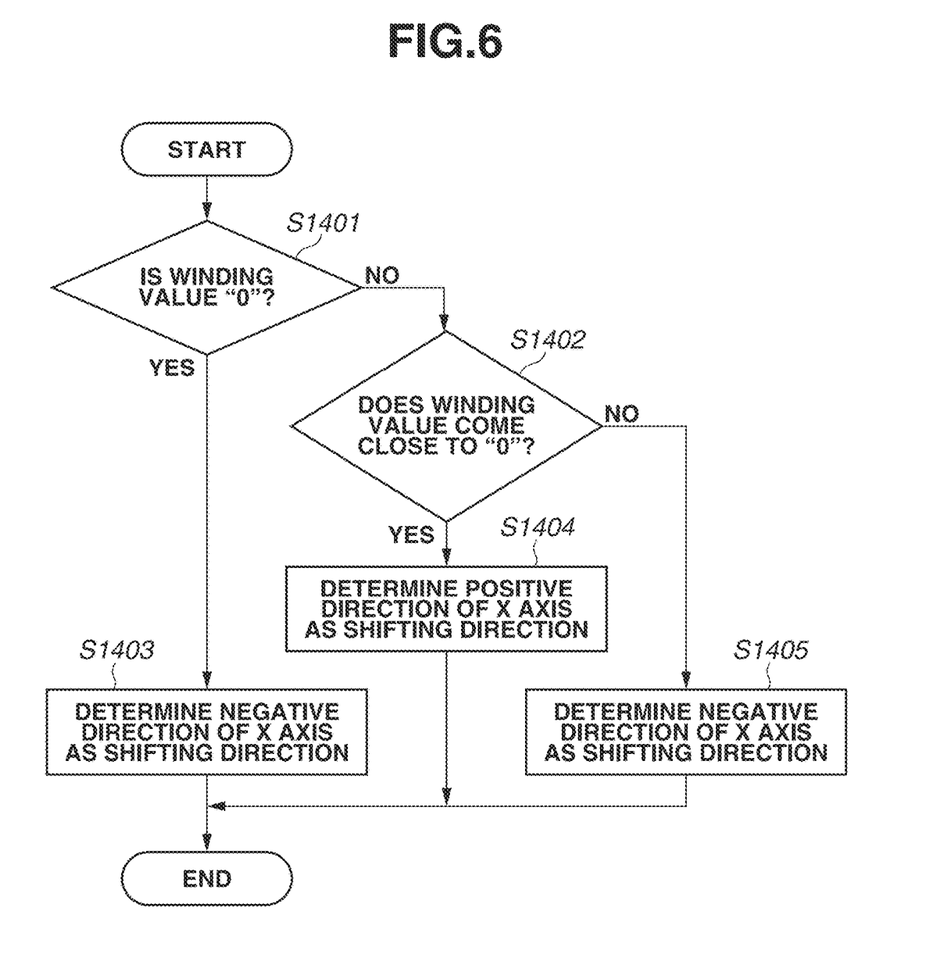
FIG. 6 is a flowchart illustrating processing for determining a shift direction of the path.

In step S1103, the path shift direction determination unit 205 performs a processing flow illustrated in FIG. 6.

Figure 7:
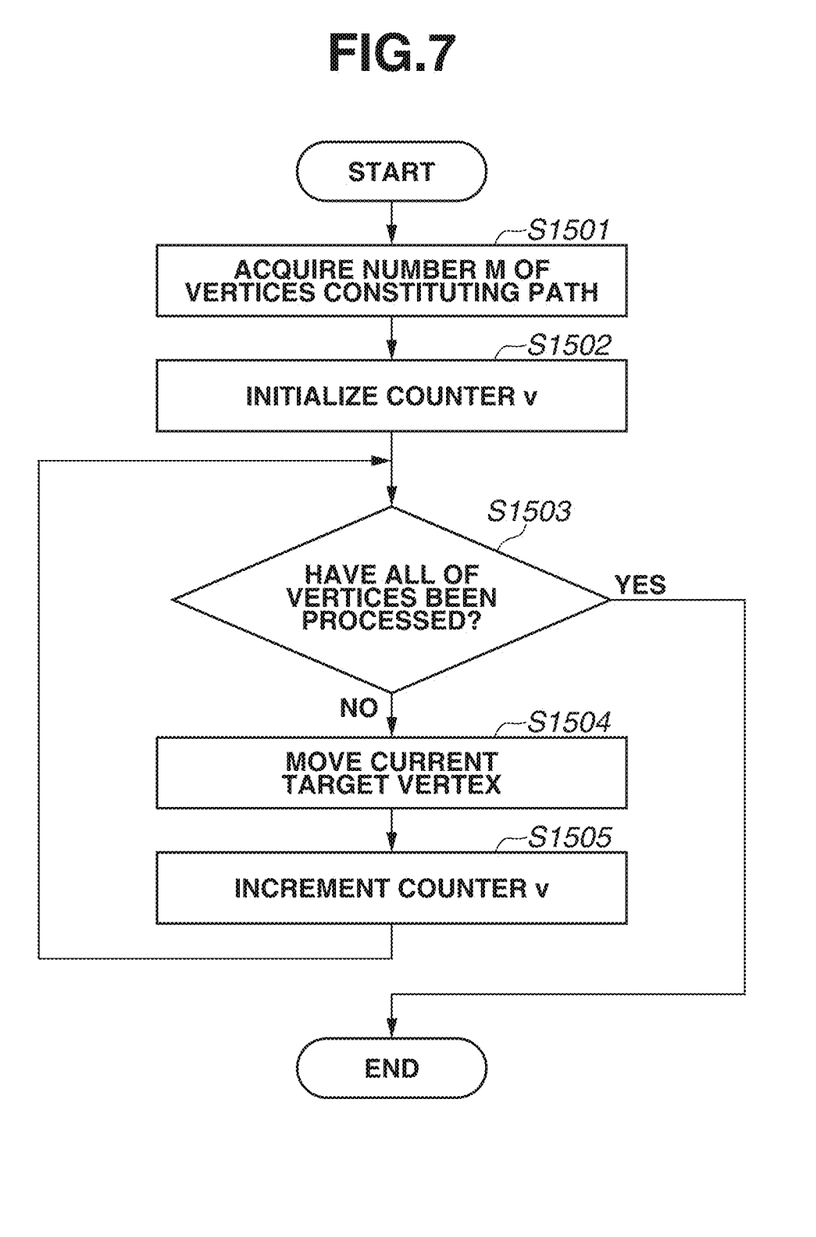
FIG. 7 is a flowchart illustrating processing for moving each vertex of the path.

In step S1104, the path generation unit 206 performs a processing flow illustrated in FIG. 7.

The above-described series of processing flows in steps S1101 to S1104 is the bold processing illustrated in FIG. 4.

The processing flow in step S1102 performed by the winding value calculation unit 204 is described with reference to FIG. 5. FIG. 5 illustrates a flow of processing for calculating the winding value of the current target path.

In step S1301, the winding value calculation unit 204 initializes the winding value to "0".

In step S1302, the winding value calculation unit 204 determines a scan line passing through the vertex specified in step S1101 (the leftmost point in the current target path). More specifically, the winding value calculation unit 204 determines a scan line that passes through the Y coordinate of the specified vertex and is parallel to the X axis. The winding value on the determined scan line is calculated according to processing described below. Then, the winding value calculation unit 204 finds the intersection point of the determined scan line with each of all the paths, including the current target path, included in the glyph path. Then, the winding value calculation unit 204 counts the number of found intersection points, and sets the counted number as the number N of intersection points.

In a case where the current target path is a path with the Id "1" of the Path structure 451 illustrated in FIG. 8C, the determined scan line is "Y=20", and the coordinates of the intersection points of the scan line with all of the paths are (40, 20) and (80, 20). Thus, the counted number N of intersection points is "2".

In a case where the current target path is a path with the Id "2" of the Path structure 451 illustrated in FIG. 8C, the determined scan line is "Y=50", and the coordinates of the intersection points of the scan line with all of the paths are (20, 50) and (100, 50). Thus, the counted number N of intersection points is "2".

In a case where the current target path is a path with the Id "1" of the Path structure 451 illustrated in FIG. 9C, the determined scan line is "Y=10", and the coordinates of the intersection points of the scan line with all of the paths are (10, 10) and (60, 10). Thus, the counted number N of intersection points is "2".

In a case where the current target path is a path with the Id "2" of the Path structure 451 illustrated in FIG. 9C, the determined scan line is "Y=20", and the coordinates of the intersection points of the scan line with all of the paths are (10, 20), (20, 20), (50, 20), and (60, 20). Thus, the counted number N of intersection points is "4".

In step S1303, the winding value calculation unit 204 initializes a counter i, which is used to count the number of processed intersection points, to "0".

In step S1304, the winding value calculation unit 204 determines whether the processing has been completed with respect to all of the intersection points found in step S1302. If the winding value calculation unit 204 determines that the processing has been completed with respect to all of the intersection points (NO in step S1304), the processing ends. If the winding value calculation unit 204 determines that the processing has not been completed with respect to all of the intersection points (YES in step S1304), the processing proceeds to step S1305. More specifically, the winding value calculation unit 204 compares the counter i with the number N of intersection points. If the counter i is equal to or greater than the number N of intersection points, the processing ends. Otherwise, the processing proceeds to step S1305.

In step S1305, the winding value calculation unit 204 determines whether the X coordinate of the current target intersection point specified by the counter i is equal to or less than the X coordinate of the vertex specified in step S1101 (the leftmost point in the current target path). In other words, this processing is determination processing for allowing the processing in step S1306 and subsequent steps to be performed with respect to only a path having an intersection point with the scan line at the left side of the leftmost point in the current target path (with respect to only a path existing on the left side). Since target paths to be processed in step S1306 and subsequent steps are limited, the amount of processing can be deceased. However, this determination in step S1305 is not indispensable. If the X coordinate of the current target intersection point is equal to or less than the X coordinate of the vertex specified in step S1101 (YES in step S1305), the processing proceeds to step S1306. Otherwise (NO in step S1305), the processing proceeds to step S1309.

In step S1306, the winding value calculation unit 204 determines the advancing direction of a path to which the target intersection point belongs. In other words, the winding value calculation unit 204 determines the manner of intersection at the current intersection point. For example, suppose that, when points constituting a path to which the target intersection point belongs are connected in sequence, the target intersection point exists on the path from a point A to a point B. In this instance, if the Y coordinate of the point A>the Y coordinate of the point B, the advancing direction is upward (first direction). If the Y coordinate of the point A<the Y coordinate of the point B, the advancing direction is downward (second direction). If the advancing direction is upward (YES in step S1306), the processing proceeds to step S1307. Otherwise (NO in step S1306), the processing proceeds to step S1308.

In step S1307, the winding value calculation unit 204 associates the current winding value and information indicating a change of the winding value with the target intersection point, and then adds "1" to the winding value. Here, the information indicating a change of the winding value refers to information indicating whether, when "1" is added to the current winding value, the result of addition comes close to "0".

In step S1308, the winding value calculation unit 204 associates the current winding value and information indicating a change of the winding value with the target intersection point, and then subtracts "1" from the winding value. Here, the information indicating a change of the winding value refers to information indicating whether, when "1" is subtracted from the current winding value, the result of subtraction comes close to "0".

In each of steps S1307 and S1308, the winding value and the above-mentioned information are associated with the leftmost vertex of the current target path. In other words, the winding value calculation unit 204 associates the winding value in the leftmost vertex and the above-mentioned information with the current target path.

In step S1309, the winding value calculation unit 204 increments the counter i by one.

Thus far is the processing flow for calculating the winding value, which is illustrated in FIG. 5.

The processing flow in step S1103, which is performed by the path shift direction determination unit 205, is described with reference to FIG. 6. FIG. 6 illustrates a flow of processing for determining a path shift direction of the current target path.

In step S1401, the path shift direction determination unit 205 refers to the winding value associated with the vertex specified in step S1101 (the leftmost point in the current target path). In other words, the path shift direction determination unit 205 refers to the winding value associated with the current target path. Then, the path shift direction determination unit 205 determines whether the referred-to winding value is "0". This determination is made to determine whether the current target path defining a closed region defines an outer edge of the closed region. If the winding value is "0", the current target path corresponds to an outer edge of the closed region. If the path shift direction determination unit 205 determines that the winding value of the leftmost point in the current target path is "0" (YES in step S1401), the processing proceeds to step S1403. Otherwise (NO in step S1401), the processing proceeds to step S1402. In the case of the paths identified by the Ids "1" and "2" of the Path element illustrated in FIG. 8C and the path identified by the Id "1" of the Path element illustrated in FIG. 9C, since the winding value is "0", the processing proceeds to step S1403. In the case of the path identified by the Id "2" of the Path element illustrated in FIG. 9C, since the winding value is "1", the processing proceeds to step S1402.

In step S1402, the path shift direction determination unit 205 refers to the information associated in step S1307 or step S1308. In other words, the path shift direction determination unit 205 refers to the information associated with the current target path. Then, the path shift direction determination unit 205 determines whether the referred-to information is first information indicating that the winding value comes close to "0". If the path shift direction determination unit 205 determines that the referred-to information indicates that the winding value comes close to "0" (YES in step S1402), the processing proceeds to step S1404. Otherwise (NO in step S1402), the processing proceeds to step S1405. In other words, if the referred-to information is second information indicating that the winding value goes away from "0", the processing proceeds to step S1405. This determination is made to determine whether the current target path defining a closed region defines an inner edge or an outer edge of the closed region. If the referred-to information indicates that the winding value comes close to "0", the current target path corresponds to an inner edge of the closed region. For example, in the case of the path identified by the Id "2" of the Path element illustrated in FIG. 9C, since information indicating that the winding value comes close to "0" is associated with that path, the processing proceeds to step S1404.

In step S1403, the path shift direction determination unit 205 determines the negative direction (leftward direction) of the X axis in the vertex specified in step S1101 as a direction to shift the current target path, and associates the determined shift direction with the current target path. For example, if the advancing direction of the current target path is clockwise, the leftward direction with regard to the advancing direction of the path is determined as the shift direction. If the advancing direction of the current target path is counterclockwise, the rightward direction with regard to the advancing direction of the path is determined as the shift direction. For example, the shift direction of the path identified by the Id "1" of the Path element illustrated in FIG. 8C is the leftward direction with regard to the advancing direction of the path, since the advancing direction of the path is clockwise. Furthermore, the shift direction of the path identified by the Id "2" of the Path element illustrated in FIG. 8C is the rightward direction with regard to the advancing direction of the path, since the advancing direction of the path is counterclockwise. Moreover, the shift direction of the path identified by the Id "1" of the Path element illustrated in FIG. 9C is the leftward direction with regard to the advancing direction of the path, since the advancing direction of the path is clockwise.

In step S1404, the path shift direction determination unit 205 determines the positive direction (rightward direction) of the X axis in the vertex specified in step S1101 as a direction to shift the current target path, and associates the determined shift direction with the current target path. For example, if the advancing direction of the current target path is clockwise, the rightward direction with regard to the advancing direction of the path is determined as the shift direction. If the advancing direction of the current target path is counterclockwise, the leftward direction with regard to the advancing direction of the path is determined as the shift direction. For example, the shift direction of the path identified by the Id "2" of the Path element illustrated in FIG. 9C is the leftward direction with regard to the advancing direction of the path, since the advancing direction of the path is counterclockwise.

In step S1405, the path shift direction determination unit 205 performs the same processing as in step S1403.

Thus far is the processing for determining the shift direction of a path.

FIG. 7 illustrates a flow of bold processing for the current target path.

In step S1501, the path generation unit 206 acquires the number M of vertices included in the current target path.

In step S1502, the path generation unit 206 initializes a counter v, which is used to count the number of processed vertices, to "0".

In step S1503, the path generation unit 206 determines whether all of the vertices included in the current target path have been processed. If the path generation unit 206 determines that all of the vertices included in the current target path have been processed (YES in step S1503), the processing ends. Otherwise (NO in step S1503), the path generation unit 206 selects one unprocessed vertex included in the current target path, and then the processing proceeds to step S1504. More specifically, the path generation unit 206 determines whether the counter v is less than the number M of vertices. If the counter v is less than the number M of vertices, the path generation unit 206 selects one unprocessed vertex included in the current target path, and then the processing proceeds to step S1504. Otherwise, the processing ends.

In step S1504, the path generation unit 206 obtains a movement vector of the current target vertex based on the shift direction associated with the current target path. For example, the path generation unit 206 obtains a resultant vector which is the combination of normal vectors on the associated shift direction side among normal vectors of the paths connected to the current target vertex, and obtains, as a movement vector, a vector obtained by multiplying the resultant vector by a predetermined coefficient. Then, the path generation unit 206 translates (moves in parallel) the position of the target vertex as much as the movement vector.

In step S1505, the path generation unit 206 increments the counter v by one, and then the processing returns to step S1503.

In the above-described way, each vertex of the path is moved, so that the area of the closed region can be increased.

Figure 10A:
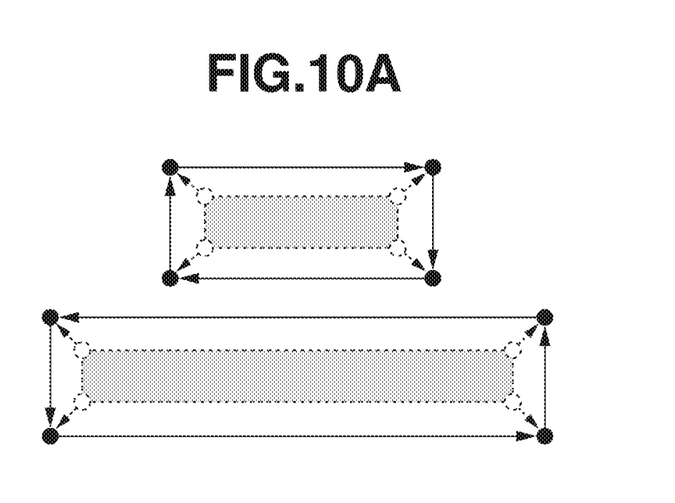
FIGS. 10A and 10B illustrate results of bold processing.
Figure 10B:
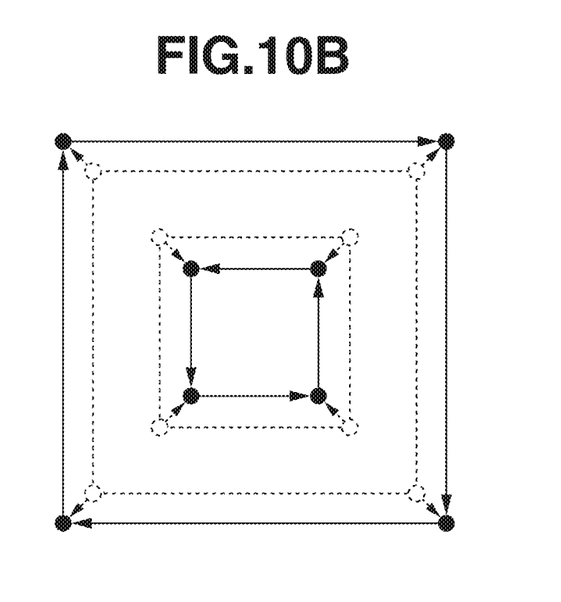

FIGS. 10A and 10B illustrate results obtained by moving the vertices of the glyph paths illustrated in FIGS. 8A and 9A, respectively, according to the bold processing in the present exemplary embodiment.

FIG. 10A illustrates a result obtained by moving the vertices constituting two paths of the katakana letter ni illustrated in FIG. 8A. Vertices that are to be moved are represented by dashed circles, and closed regions defined by the vertices that are to be moved are filled by gray. Dashed arrows indicate movement vectors obtained according to the present exemplary embodiment. Vertices moved according to the movement vectors are represented by circles filled by black. In this way, even in the case of paths having opposite advancing directions with closed regions, the bold processing can be appropriately performed.

Furthermore, FIG. 10B illustrates a result obtained by moving the vertices constituting two paths of the katakana letter ro illustrated in FIG. 9A. Even in the case of paths illustrated in FIG. 10B, the bold processing can also be appropriately performed as in FIG. 10A.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-000436 filed Jan. 5, 2015, which is hereby incorporated by reference herein in its entirety.

What is claimed is:

1. An information processing apparatus comprising:
a memory configured to store a program; and
a processor configured to execute the program to function as:
an acquisition unit configured to acquire a plurality of vertices forming one path included in a glyph path indicating an outline of a letter,
a calculation unit configured to calculate a winding value relating to the one path,
a determination unit configured to determine a shift direction of the one path based on the calculated winding value, and
a movement unit configured to move positions of the plurality of vertices based on the determined shift direction,
wherein, when a leftmost vertex among the plurality of vertices is a leftmost vertex among vertices forming the glyph path, the calculation unit sets the winding value to be associated with the one path as a specific value, and the determination unit determines a specific direction as the shift direction of the one path.

2. The information processing apparatus according to claim 1, wherein the calculation unit is configured to calculate a winding value on a line passing through a leftmost vertex among the plurality of vertices, and associate the calculated winding value with the one path.

3. A method for an information processing apparatus, the method comprising:
acquiring a plurality of vertices forming one path included in a glyph path indicating an outline of a letter;
calculating a winding value relating to the one path;
determining a shift direction of the one path based on the calculated winding value; and
moving positions of the plurality of vertices based on the determined shift direction,
wherein, when a leftmost vertex among the plurality of vertices is a leftmost vertex among vertices forming the glyph path, calculating includes setting the winding value to be associated with the one path as a specific value, and determining includes determining a specific direction as the shift direction of the one path.

4. The method according to claim 3,
wherein calculating includes calculating a winding value on a line passing through a leftmost vertex among the plurality of vertices, and associating the calculated winding value with the one path, and
wherein, based on a manner of intersection of the line with another path that exists on the left side of the leftmost vertex and is included in the glyph path, calculating includes calculating a winding value to be associated with the leftmost vertex.

5. The method according to claim 3, wherein, based on an advancing direction of another path defined according to a sequence of connection of vertices forming the another path, calculating includes calculating a winding value to be associated with the one path.

6. The method according to claim 5,
wherein, if the advancing direction of the one path at the leftmost vertex of the one path is a first direction, calculating includes performing addition to a current winding value and determining whether the winding value subjected to the addition comes close to a specific value,
wherein, if it is determined that the winding value subjected to the addition comes close to the specific value, calculating includes associating first information with the one path,
wherein, if it is determined that the winding value subjected to the addition goes away from the specific value, calculating includes associating second information with the one path, and
wherein determining includes determining the shift direction of the one path based on whether the first information or the second information is associated with the one path.

7. The method according to claim 6,
wherein, if the advancing direction of the one path at the leftmost vertex of the one path is a second direction different from the first direction, calculating includes performing subtraction from a current winding value and determining includes determining whether the winding value subjected to the subtraction comes close to the specific value,
wherein, if it is determined that the winding value subjected to the subtraction comes close to the specific value, calculating includes associating the first information with the one path, and
wherein, if it is determined that the winding value subjected to the subtraction goes away from the specific value, calculating includes associating the second information with the one path.

8. The method according to claim 3,
wherein determining includes determining whether the one path corresponds to an outer edge of a closed region based on the associated winding value,
wherein, if it is determined that the one path corresponds to the outer edge of the closed region, determining includes determining a specific direction as the shift direction of the one path, and
wherein, if it is determined that the one path does not correspond to the outer edge of the closed region, determining includes determining a direction opposite the specific direction as the shift direction of the one path.

\* \* \* \* \*